United States Patent [19]
Tamechika et al.

[11] Patent Number: 5,714,869
[45] Date of Patent: Feb. 3, 1998

[54] POWER SOURCE APPARATUS WITH BATTERY AND OVERCHARGE PROTECTION CIRCUIT

[75] Inventors: Masanari Tamechika; Kimitoshi Fukae, both of Nara; Nobuyoshi Takehara, Kyoto-fu, all of Japan

[73] Assignee: Canon Kabushiki Kaisha, Tokyo, Japan

[21] Appl. No.: 726,937

[22] Filed: Oct. 7, 1996

[30] Foreign Application Priority Data

Oct. 26, 1995 [JP] Japan ................. 7-300505

[51] Int. Cl.$^6$ ........................ H02J 7/04
[52] U.S. Cl. ................. 320/30; 320/2; 320/61
[58] Field of Search .................. 320/2, 21, 30, 320/61, 32, 39

[56] References Cited

U.S. PATENT DOCUMENTS

| | | | |
|---|---|---|---|
| 4,266,178 | 5/1981 | Asakawa | 320/39 |
| 4,382,211 | 5/1983 | Staler | 320/9 |
| 5,153,497 | 10/1992 | Eiden | 320/61 |
| 5,585,991 | 12/1996 | Williams | 361/30 |

*Primary Examiner*—Peter S. Wong
*Assistant Examiner*—Patrick B. Law
*Attorney, Agent, or Firm*—Fitzpatrick, Cella, Harper & Scinto

[57] ABSTRACT

A power source apparatus includes a power generation device, a battery and an overcharge protection circuit. The overcharge protection circuit includes a shunt circuit, including a switching device for short-circuiting the power generation device when an input signal is at an 'L' level. A reverse current protection circuit prevents an electric current from reversely flowing to the power generation device and/or the shunt circuit. A voltage detection section detects the voltage of the load or between the poles of the battery. An overcharge judgement section outputs an 'L' level to the switching device when the voltage value detected by the voltage detection section surpasses a preset voltage value. When the voltage across the battery surpasses a predetermined value, the power source apparatus is short-circuited by the overcharge protection circuit, and therefore it is possible to prevent overvoltage from being applied to the load. In addition, even when the battery is disconnected, oscillation of the overcharge protection circuit can be prevented.

7 Claims, 8 Drawing Sheets

POWER SOURCE APPARATUS WITH BATTERY AND OVERCHARGE PROTECTION CIRCUIT

BACKGROUND OF THE INVENTION

1. Field of the Invention

The present invention relates to a power source apparatus including an overcharge protection circuit capable of preventing the maximum voltage of a power generation device, in particular, a solar cell, from being directly applied to a load when the battery is disconnected.

2. Description of the Related Art

As a conventional overcharge protection circuit, there is a solar cell power source apparatus disclosed in, for example, Japanese Examined Patent Publication No. 6-67135.

FIG. 8 shows a solar cell power source apparatus using this type of overcharge protection circuit. Shown in FIG. 8 are a solar cell 1, a battery 2, such as a lead battery or a nickel hydrogen battery, which is charged by the solar cell 1, a load 3, such as, for example, an electric light, which consumes power from the solar cell 1 and the battery 2, a reverse current protection circuit 4 for preventing a current from reversely flowing to the solar cell side, and an overcharge protection circuit 5 for regulating the current charging the battery 2 by short-circuiting the output of the solar cell 1 before the battery 2 reaches an overcharged state.

The overcharge protection circuit 5 will be described below.

When the battery 2 approaches an overcharged state, the terminal-to-terminal voltage increases. The terminal-to-terminal voltage is detected by a voltage detection section 5a, and this voltage is compared with the constant voltage of a constant-voltage source 5b by a first differential amplifier 5c. When the voltage exceeds a preset value, the output of the first differential amplifier 5c becomes high. The input of a second differential amplifier 5e becomes high after a slight delay imposed by a delay circuit 5d, and the output thereof also becomes high, causing a switching transistor 61 to be turned on, as a result of which an electric current flows through a shunt circuit 5f. As a result, the power from the solar cell 1, which has been consumed only by the load 3 thus far, is consumed also by the shunt circuit 5f, and the current charging the battery 2 is regulated.

If, at this time, the battery 2 is disconnected for maintenance or the like, the switching transistor 61 is turned on as shown in FIG. 9, causing the voltage of the solar cell 1 to be sharply decreased. As a result, what is commonly called an oscillation is caused, in which the switching transistor 61 repeatedly turns on and off. Provision of the delay circuit 5d prevents occurrence of an oscillation high enough to cause the overcharge protection circuit 5 itself to break down.

However, when the battery 2 is disconnected, the following problems occur. Since a battery is not present while the switching transistor 61 is turned off, the open circuit voltage of the solar cell 1 is directly applied to the load, which cause the load 3 to break down.

SUMMARY OF THE INVENTION

An object of the present invention is to provide a power source apparatus including an overcharge protection circuit which does not apply an overvoltage to a load even if the battery is disconnected.

To achieve the above-described object, according to the present invention, there is provided a power source apparatus comprising: a power generation device, a battery and an overcharge protection circuit, wherein the overcharge protection circuit comprises: a shunt circuit including a switching device for short-circuiting the power generation device when an input signal is at an 'L' level; a reverse current protection circuit for preventing an electric current from reversely flowing to the power generation device and/or the shunt circuit; a voltage detection section for detecting the voltage of the load or across both poles of the battery; and an overcharge judgment section for outputting an 'L' level to the switching device when the voltage value detected by the voltage detection section surpasses a preset voltage value.

In the overcharge protection circuit of the present invention, since the solar cell is short-circuited when the voltage across the ends of the battery surpasses a predetermined value, even if the battery is disconnected, there is no risk of an overvoltage of the open circuit voltage of the solar cell or the like being applied to the load. Further, since the solar cell is short-circuited when the voltage of the other end of the battery is 0 V, it is possible to prevent oscillation of the overcharge protection circuit even if the battery is disconnected.

The above and further objects, aspects and novel features of the invention will become more apparent from the following detailed description when read in connection with the accompanying drawings.

DESCRIPTION OF THE PREFERRED EMBODIMENTS

The power source apparatus of the present invention comprises a power Generation device, a battery and an overcharge protection circuit.

[Overcharge protection circuit]

The four embodiments of an overcharge protection circuit of the present invention will be described below.

[First Embodiment]

Figure 1:
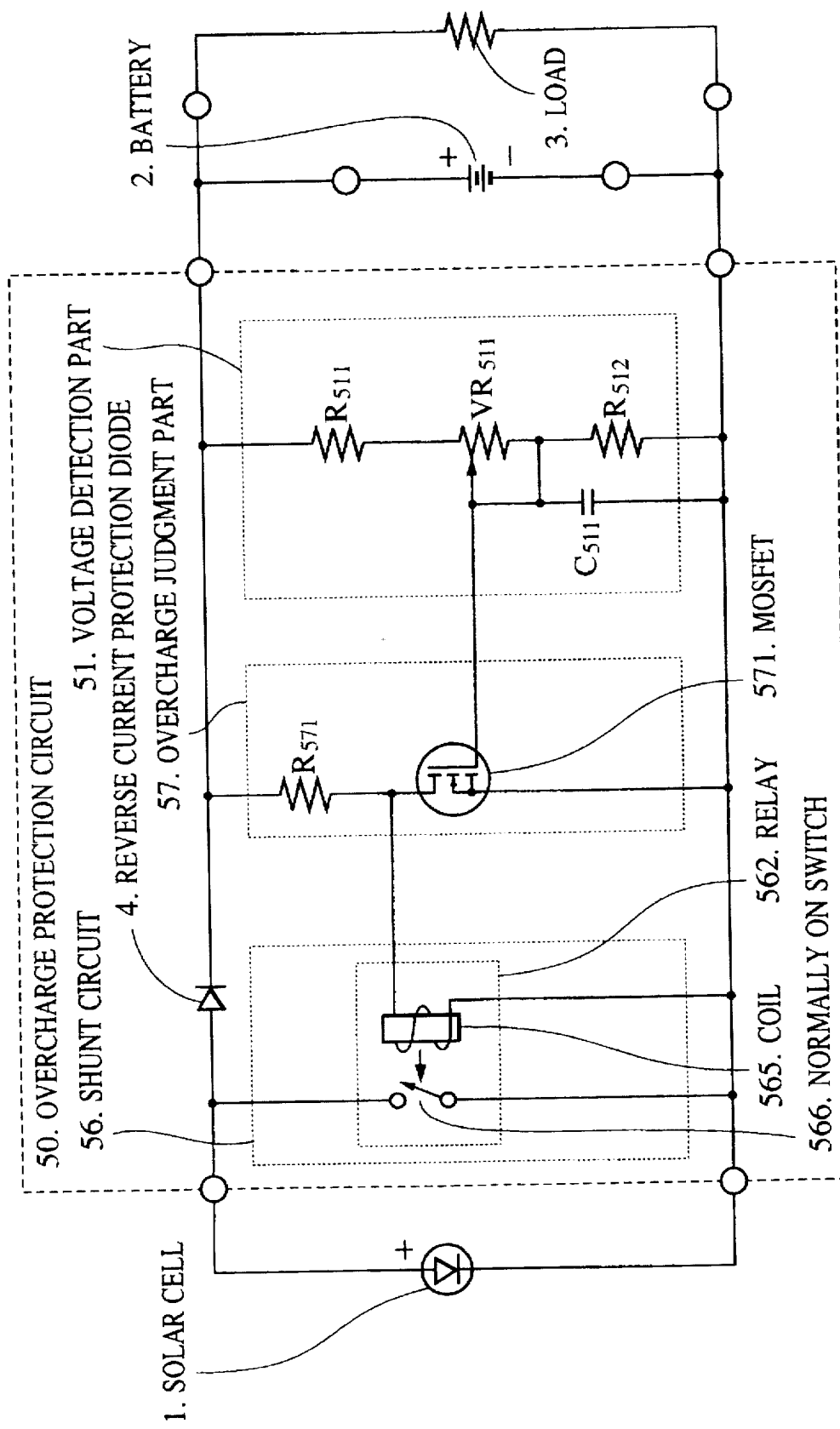
FIG. 1 shows a power source apparatus in which an overcharge protection circuit of a first embodiment of the present invention is used.

FIG. 1 shows a first embodiment of a power source apparatus using an overcharge protection circuit according to the present invention.

In this embodiment, the solar cell 1 is connected to the battery 2 and the load 3 through the reverse current protection circuit 4, with the voltage across the battery 2 and/or the load 3 being detected by the voltage detection section 51. The detected voltage signal is input to an overcharge judgment section 57.

The detected voltage signal is compared with the threshold gate voltage Vth of an N-type MOSFET (metal-oxide-semiconductor field-effect transistor) 571. The threshold gate voltage Vth is adjusted by a variable resistor VR 511 so that Vth becomes equal to a reference voltage at which the battery 2 becomes overcharged. When the detected voltage signal exceeds the Vth, namely, when the battery 2 reaches the overcharge state, the N-type MOSFET 571 is turned on, causing the output signal of the overcharge judgment section 57 to fall to an 'L' or low voltage level. The drop of the output signal of the overcharge judgment section 57 to the 'L' level causes the current flowing through a coil 565 to be decreased. As a result, a normally on-type switch 566 is closed, causing both ends of the solar cell 1 to be short-circuited.

Figure 2:
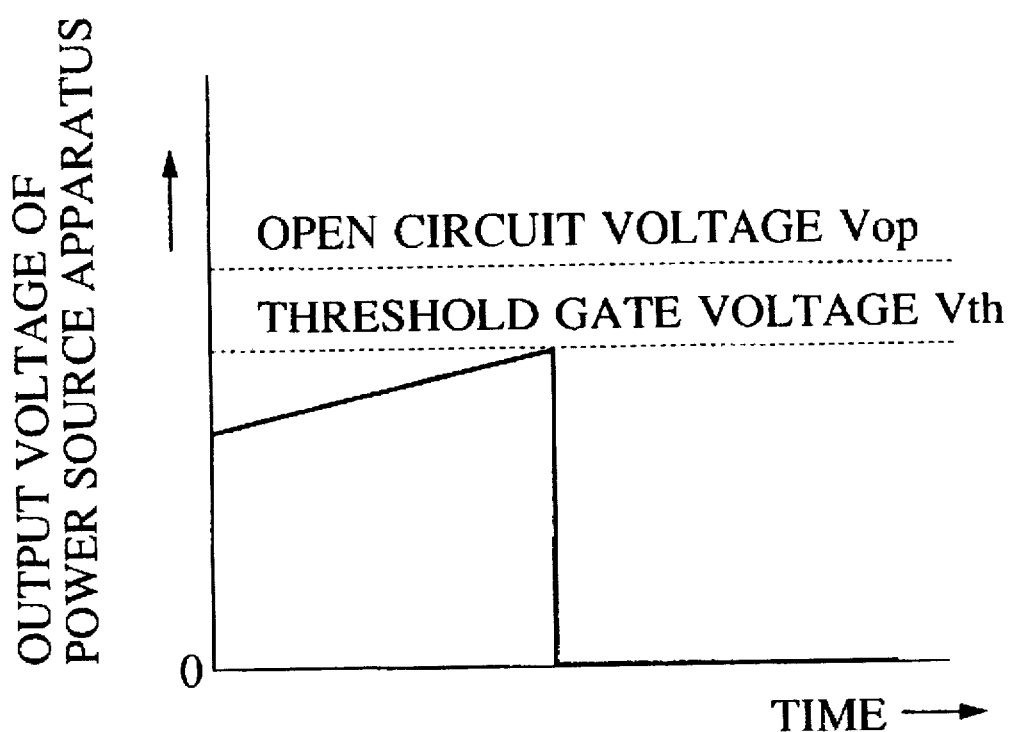
FIG. 2 shows the characteristics when the overcharge protection circuit of the present invention is used.

If, at this time, the battery 2 is disconnected for maintenance or the like, the voltage detected by the voltage detection section 51 decreases suddenly. For this reason, the MOSFET 571 is turned off and at the same time the voltage of the overcharge judgment section 57 also decreases sharply. The reason for this sharp decrease is that the solar cell has been short-circuited and the battery has been disconnected. Therefore, it is not possible for the MOSFET 571 to output an 'H'-level signal, with the output signal being kept at the 'L' level. As a result, the current flowing through the coil 565 does not vary, with the normally-on-type switch 566 being kept closed and the solar cell being short-circuited. Therefore, as shown in FIG. 2, no oscillation occurs.

Therefore, it does not occur that the open circuit voltage Vop of the solar cell 1 is applied to the load 3, which can destroy the load, and thus a very safe power source apparatus is accomplished.

[Second Embodiment]

Figure 3:
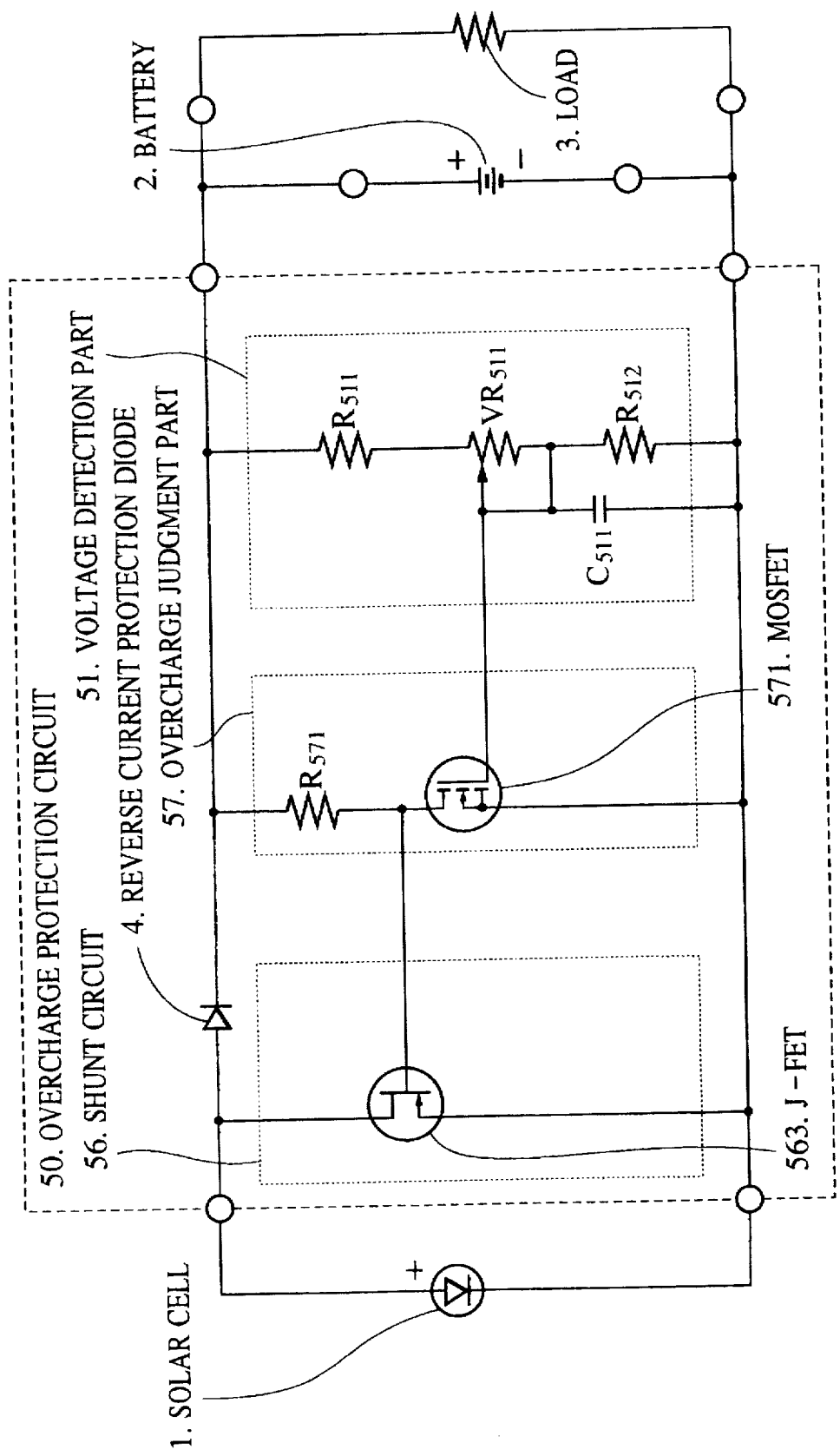
FIG. 3 shows a power source apparatus in which an overcharge protection circuit of a second embodiment of the present invention is used.

FIG. 3 shows a second embodiment of a power source apparatus using an overcharge protection circuit according to the present invention.

Figure 4:
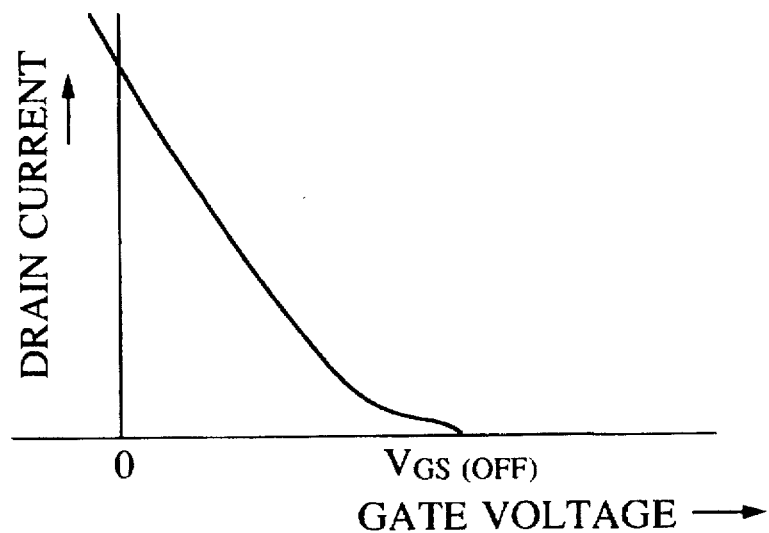
FIG. 4 is a characteristic diagram of a conventional depletion-type P-type J-FET (junction field-effect transistor)

In this embodiment, the shunt circuit 56 consists of, rather than a normally on-type relay like switch 562 in FIG. 1, a depletion mode P-type J-FET 563 having characteristics such that the drain-to-source section is short-circuited when the gate voltage is 0 V, as shown in FIG. 4. The other components are the same as those of the first embodiment.

In a case in which an overcharge is detected by the overcharge judgment section 57, the output signal with a value 'L' is input to the gate of a J-FET 563, causing the J-FET 563 to be turned on and causing both ends of the solar cell 1 to be short-circuited.

If at this time the battery 2 is disconnected for maintenance or the like, the voltage detected by the voltage detection section 51 decreases suddenly. For this reason, the MOSFET 571 is turned off and at the same time the voltage of the overcharge judgment section 57 also decreases sharply. The reason for this sharp decrease is that the solar cell has been short-circuited and the battery has been disconnected. Therefore, it is not possible for the MOSFET 571 to output an 'H'-level signal, and thus the output signal is kept at the 'L' level. As a result, the gate voltage of the J-FET 563 is not varied and its on state continues, so that the solar cell is kept short-circuited. Therefore, as shown in FIG. 2, no oscillation occurs.

Therefore, the open circuit voltage Vop of the solar cell 1 is not applied to the load 3, and thus a very safe power source apparatus can be realized.

This embodiment has advantages in that, since no relay is used, the consumption of electric current is small, and the power of the solar cell can be effectively utilized.

Although in this embodiment a depletion-mode P-type J-FET is used, a normally-on-type device, for example, a depletion mode MOSFET, can be used to accomplish the same effect.

[Third Embodiment]

Figure 5:
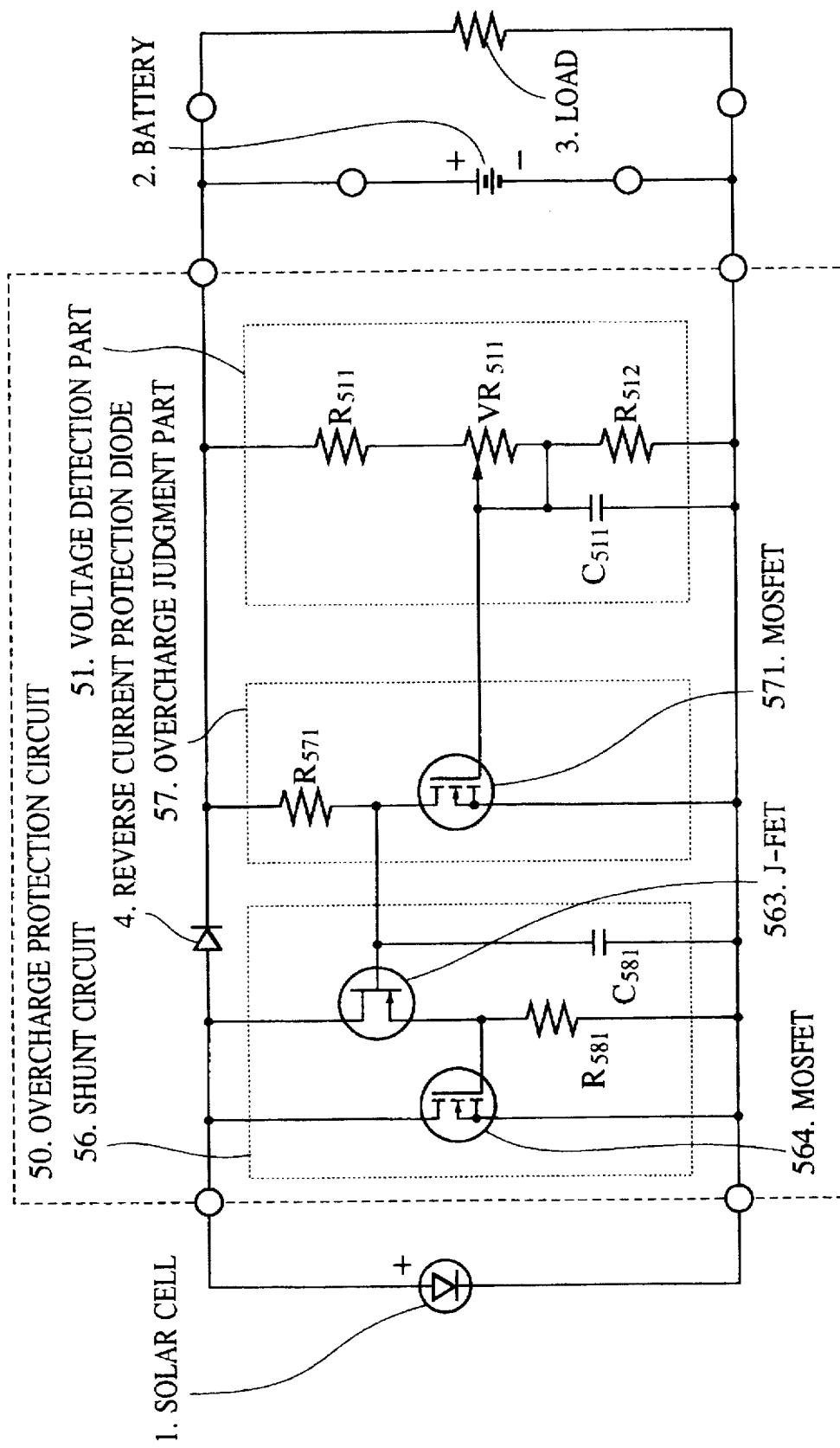
FIG. 5 shows a power source apparatus in which an overcharge protection circuit of a third embodiment of the present invention is used.

FIG. 5 shows a third embodiment of a power source apparatus using an overcharge protection circuit according to the present invention.

In this embodiment, the shunt circuit 56 comprises a depletion mode P-type J-FET 563 and an N-type power MOSFET 564 through which a large current can flow. The other components are the same as those of the second embodiment.

Figure 6:
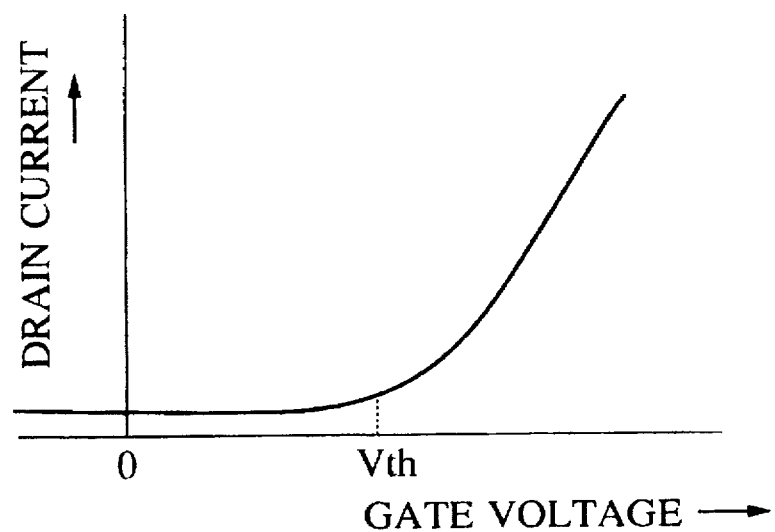
FIG. 6 is a characteristic diagram of a conventional N-type MOSFET (metal-oxide-semiconductor field-effect transistor)

In this embodiment, a resistance value R581 in the shunt circuit 56 is made to be a sufficiently large value, and to satisfy the following relation (for reference, the general characteristics of the N-type power MOSFET are shown in FIG. 6):

Vth of MOSFET 564 < cutoff gate voltage ($V_{GS(OFF)}$) of J-FET 563 + voltage drop of reverse current protection circuit 4.

The output signal of the overcharge judgment section 57 is input to the gate of the J-FET 563. The drop of the output signal of the overcharge judgment section 57 to the 'L' level causes the J-FET 563 to be turned on and causes the gate voltage of the MOSFET 564 to reach an 'H' or high voltage level. Then, the MOSFET 564 is turned on, as can be seen from FIG. 6, causing both ends of the solar cell 1 to be short-circuited.

If at this time the battery 2 is disconnected for maintenance or the like, the voltage detected by the voltage detection section 51 decreases suddenly. Therefore, the MOSFET 571 is turned off, and at the same time the output of the overcharge judgment section 57 also decreases sharply. Even in this state, the gate voltage of the depletion-mode J-FET 563 decreases and its ON state continues. However, the gate voltage of the MOSFET 564 is also decreased, the amount of electric current flowing through the MOSFET 564 is decreased, and the voltage of the solar cell 1 increases.

However, since there is a voltage drop of the reverse current protection circuit, before the gate voltage ($V_{GS(OFF)}$) at which the J-FET 563 is turned off is reached, the gate voltage of the MOSFET 564 reaches Vth. Therefore, the MOSFET 564 is stabilized at a point near the saturation point, and no oscillation occurs.

Therefore, the open circuit voltage of the solar cell 1 is not applied to the load 3, and thus a very safe power source apparatus can be realized. Further, in this embodiment, since a power MOSFET is used in the switching device, not only is the consumption of electric current small, but also the circuit is simplified and the cost can be easily reduced.

[Fourth Embodiment]

Figure 7:
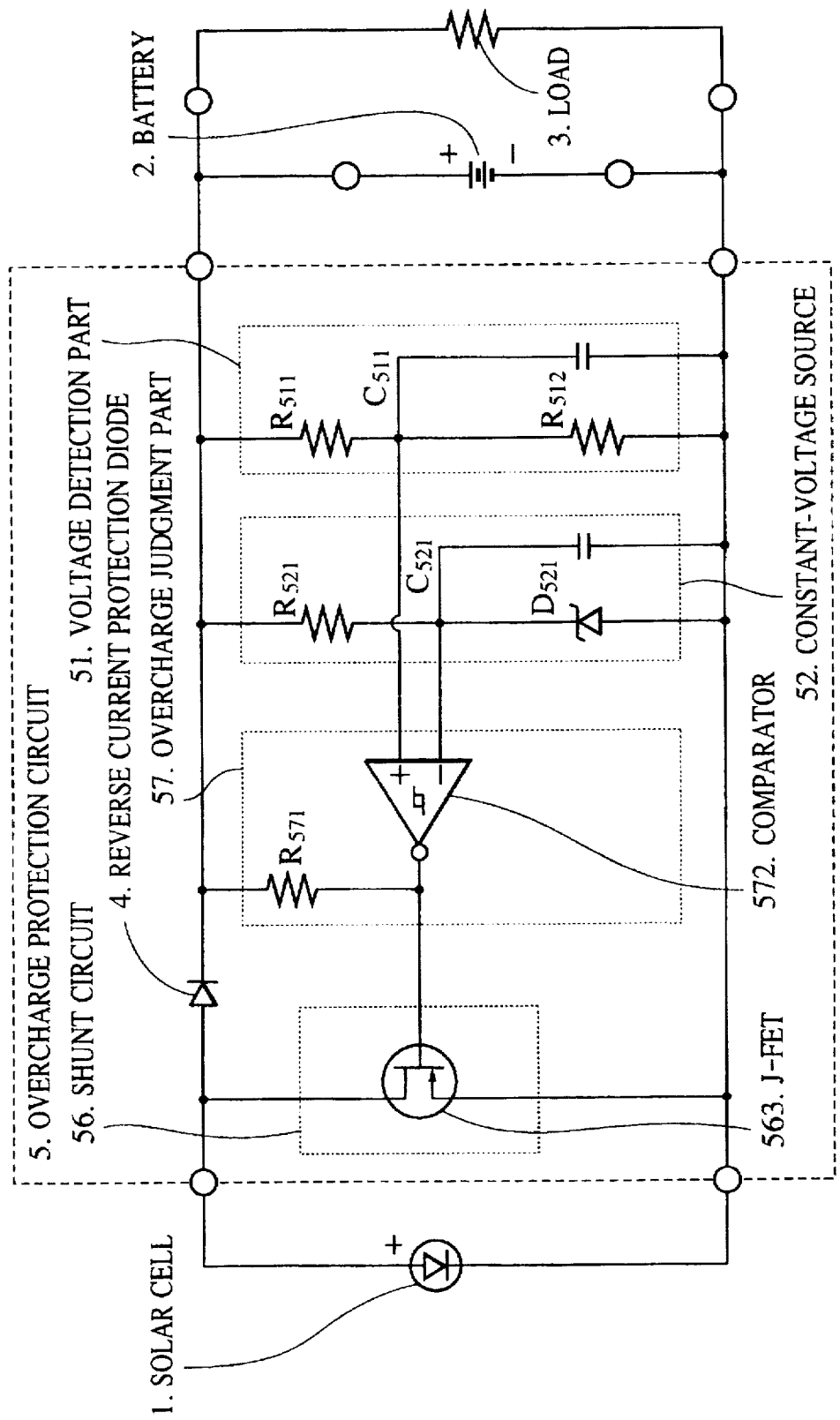
FIG. 7 shows a power source apparatus in which an overcharge protection circuit of a fourth embodiment of the present invention is used.
Figure 8:
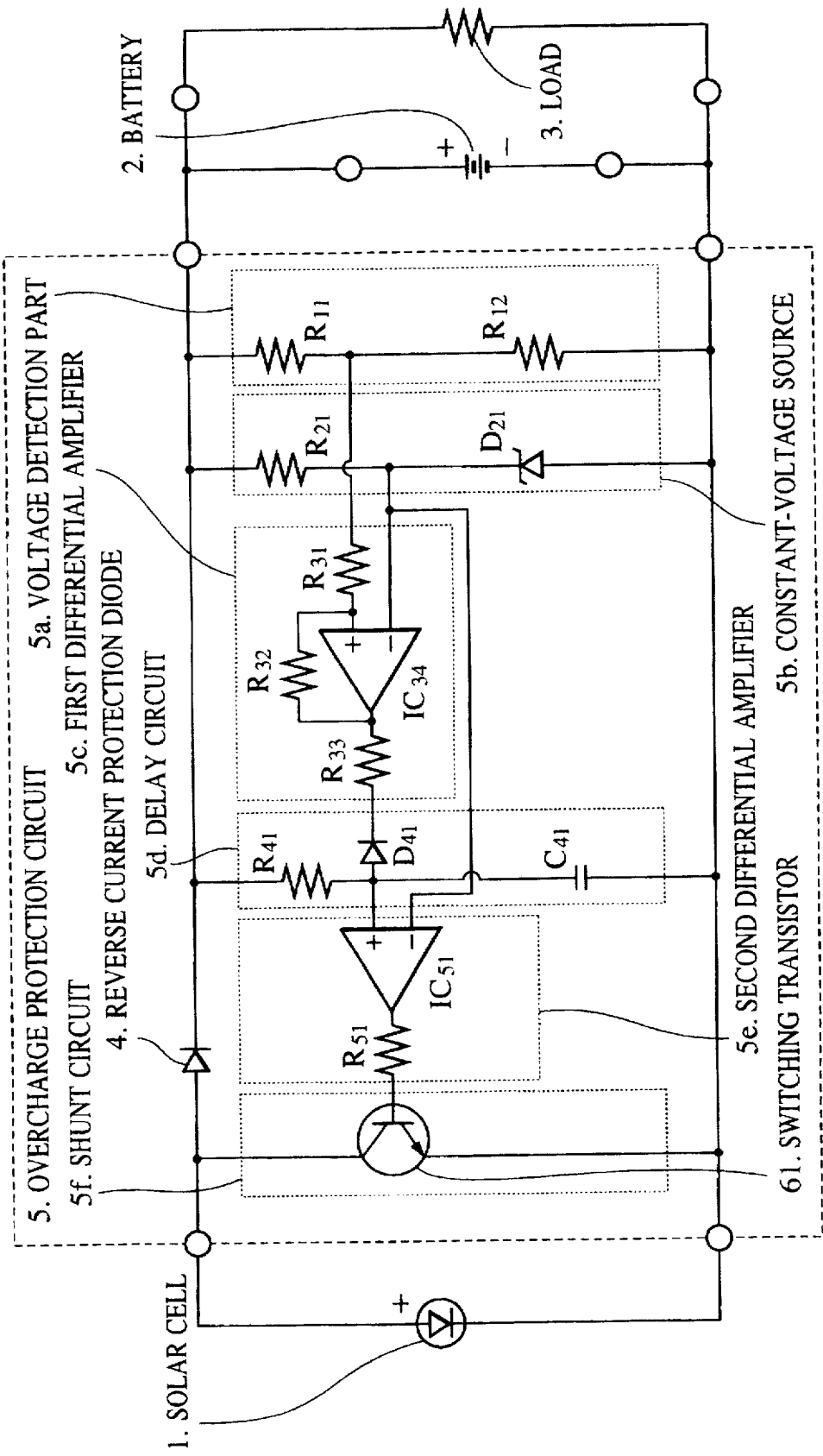
FIG. 8 shows a power source apparatus in which a conventional overcharge protection circuit is used.
Figure 9:
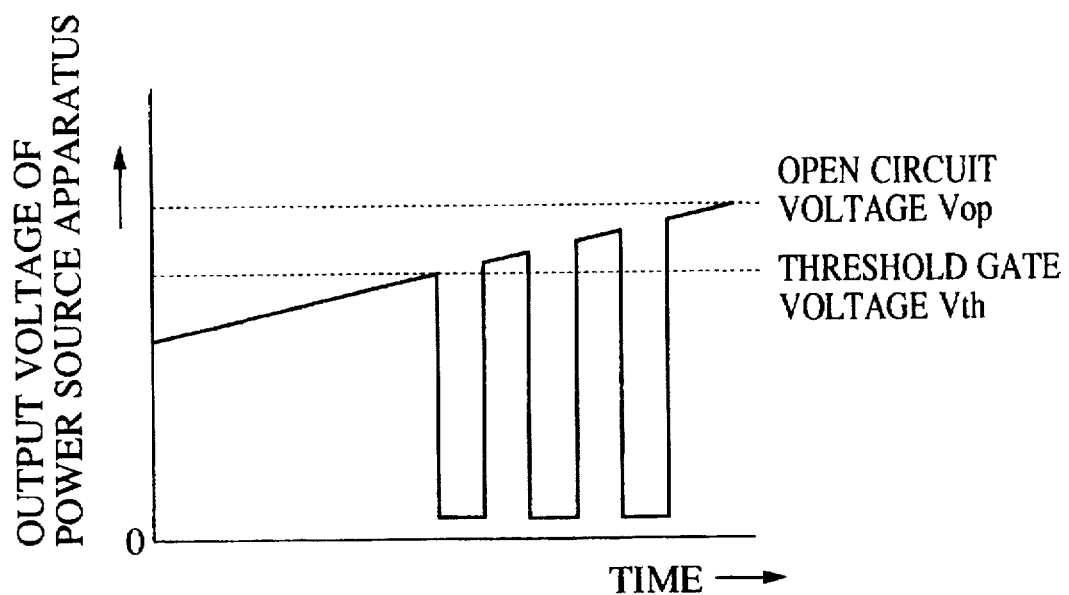
FIG. 9 is a characteristic diagram for a case in which a conventional overcharge protection circuit is used.

FIG. 7 shows a fourth embodiment of a power source apparatus using an overcharge protection circuit according to the present invention.

In this embodiment, the overcharge judgment section 57 comprises a digital-output-type comparator 572 rather than the MOSFET 571 and is designed to compare the voltage level of the constant-voltage source 52 with that of the voltage detection section 51. The other components are the same as those of the second embodiment.

The overcharge judgment section 57 in this embodiment not only accomplishes the aforementioned effects but also has the advantage of, for example, what is commonly called hysteresis is provided in the behavior of the voltage at which the output changes from an 'L' level to an 'H' level, and vice versa.

[Power generation device]

Although in the above-described embodiment a solar cell is used for the power generation device, the power generation device is not limited to this example. For example, a power generation device using wind power, water power, wave power or the like is possible.

[Battery]

The battery used in the power source apparatus of the present also is not particularly limited. For example, a lead battery, a nickel cadmium battery, a nickel hydrogen battery, a lithium ion battery and the like can also be used.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as herafter claimed. The scope of the following claims is to be accorded the broadest interpretation so as to encompass all such modifications, equivalent structures and functions.

What is claimed is:

1. A power source apparatus, comprising: a power generation device, a battery and an overcharge protection circuit, wherein said overcharge protection circuit comprises:

a shunt circuit including a switching device for short-circuiting said power generation device when an input signal is a low voltage;

a reverse current protection diode for preventing an electric current from reversely flowing to at least one of said power generation device and said shunt circuit;

a voltage detection section for detecting one of the voltage of a load and the voltage between poles of said battery; and an overcharge judgment section for outputting the low voltage signal to said switching device when the voltage value detected by said voltage detection section surpasses a preset voltage value.

2. A power source apparatus according to claim 1, wherein said switching device comprises one of a normally on-type relay and a depletion-mode FET.

3. A power source apparatus according to claim 1, wherein said switching device comprises a MOSFET having a gate, a gate signal of said MOSFET being controlled by a depletion-type FET, and a threshold gate voltage of said MOSFET being a value lower than the sum of a cutoff gate voltage of said depletion-type FET and the voltage drop of said reverse current protection diode.

4. A power source apparatus according to 1, wherein said overcharge judgment section comprises a MOSFET.

5. A power source apparatus according to 1, wherein said overcharge protection circuit includes a constant-voltage source, and said overcharge judgment section comprises a comparator.

6. A power source apparatus according to 1, wherein said power generation device comprises a solar cell.

7. A power source apparatus according to 1, wherein said battery is one type selected from a lead battery, a nickel cadmium battery, a nickel hydrogen battery, and a lithium ion battery.

* * * * *

UNITED STATES PATENT AND TRADEMARK OFFICE
CERTIFICATE OF CORRECTION

PATENT NO. : 5,714,869

DATED : February 3, 1998

INVENTOR(S) : MASANARI TAMECHIKA ET AL.

It is certified that error appears in the above-identified patent and that said Letters Patent is hereby corrected as shown below:

COLUMN 1

Line 57, "cause" should read --causes--.

COLUMN 2

Line 59, "Generation" should read --generation--.

COLUMN 5

Line 15, "present" should read --present invention--.

COLUMN 6

Line 22, "1," should read --claim 1,--.
   Line 24, "1," should read --claim 1,--.
   Line 28, "1," should read --claim 1,--.
   Line 31, "1," should read --claim 1,--.

Signed and Sealed this

First Day of September, 1998

*Attest:*

BRUCE LEHMAN

*Attesting Officer*     *Commissioner of Patents and Trademarks*